April 23, 1957  P. J. SHIPE ET AL  2,789,901
METHOD OF MAKING HIGH DENSITY SINTERED PARTS
Filed May 27, 1952

INVENTORS
Paul J. Shipe
BY Athan Stosuy

Their Attorney

United States Patent Office 2,789,901
Patented Apr. 23, 1957

2,789,901

METHOD OF MAKING HIGH DENSITY SINTERED PARTS

Paul J. Shipe and Athan Stosuy, Dayton, Ohio, assignors to General Motors Corporation, Detroit, Mich., a corporation of Delaware Application May 27, 1952, Serial No. 290,121

6 Claims. (Cl. 75—214)

This invention relates to a method for making parts from iron powder wherein the parts have high strength and density.

It is therefore an object of the invention to provide a method for manufacturing parts from iron powder including carbon together with alloying ingredients wherein a part may be manufactured which has high strength and high density together with other good physical characteristics.

In carrying out the above object, it is a further object of the invention to produce an article by briquetting iron powder and carbon to a size and shape approximating that desired, sintering said part at a relatively low sintering temperature, sizing the part under relatively high pressures for reducing the porosity thereof and finally sintering the sized part at a relatively higher temperature than that used in the first sintering operation for forming a strong article of relatively high density and of good physical characteristics.

In carrying out the foregoing objects, it is a further object in some cases to produce infiltrated parts such as blades for wheels and stators of axial flow compressors wherein the part is sized to a density not in excess of 113 grams per cubic inch, finally sintered and is then infiltrated with a cupreous metal.

Another object of the invention is to provide a method for making parts from iron powder wherein the first step comprises briquetting the part to a density of between 90 to 100 grams per cubic inch, heating the part under nonoxidizing conditions to a temperature in the order of 1600° F., compressing the heated part to increase the density thereof to between 105 to 123 grams per cubic inch and then sintering the so compressed part under controlled conditions of atmosphere to a temperature of about 2000° to 2050° F. and for a time sufficient to sinter the part into a strong homogeneous article of high density.

Another object of the invention is to provide a method for making high strength parts from iron and carbon mixtures in powdered form wherein the part is devoid of flash. This is accomplished by the use of sizing dies for bringing the parts to the exact size wherein the die is confined and the part is actually consolidated within itself due to its inherent initial porosity and good compressibility.

Figure 1:
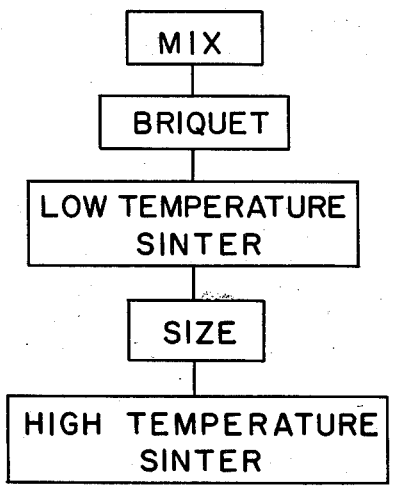
Figure 2:
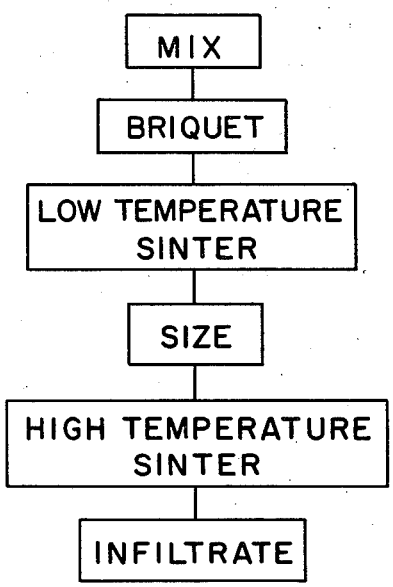

Further objects and advantages of the present invention will be apparent from the following description, reference being had to the accompanying drawings which are flow charts of the method of operation wherein Figure 1 is directed to the sintering method while Figure 2 shows the sintering method with the infiltration step.

In the manufacture of parts from iron powder with carbon, high strength is a very necessary requirement wherein the parts are to be substituted for similar articles made from conventional cast or wrought metals. This is generally accomplished through hot-pressing, wherein a briquetted part is sintered and is then hot-pressed in a forging die to the exact size and shape desired. One of the drawbacks to this method of operation is the flash involved during the hot-pressing operation. This is occasioned by the fact that the porous iron part, after sintering, is of relatively low density, which density is increased in the hot-pressing operation with an attendant large change in dimension of the part which develops objectionable flash at the parting line of the dies.

This invention is particularly directed to a method for obtaining high strength and high density in the part without the hot-coining or forging step whereby flash is substantially eliminated and wherein a suitable high strength, low porosity part is obtained in a more facile manner. Essentially, the process revolves around a two-step sintering procedure wherein the part is briquetted from iron powder, suitably mixed with a controlled quantity of carbon, to a size slightly larger than the ultimate size desired. This part is then sintered in a controlled atmosphere at a relatively low sintering temperature such as will not cause appreciable carbon diffusion into the iron, for example, in the order of 1600° to 1700° F. for about thirty minutes. During this sintering step, some dimensional change may occur but more important, adjacent particles of iron bond together to form a porous and relatively compressible network. This partially sintered part is taken from the furnace and is then sized or compressed, either hot or cold, to increase the density and to bring the article to the desired size. This sizing or compressing step takes place in a die having the exact shape and size ultimately desired, and the metal part, due to its compressibility, is actually compressed within itself whereby no flash is present and the porosity is greatly reduced.

After sizing the part is finally sintered at a temperature ranging from 1900° to 2050° F. for from fifteen to forty-five minutes. This final sintering is carried out under controlled atmospheric conditions and during this step, due to the increase in temperature over the first sintering, carbon diffusion occurs within the iron.

A specific example in the manufacture of a part by the process described concerns the mixing of a suitable iron powder, such as sponge iron, iron powder produced from reduced iron oxide or any other suitable iron powder together with carbon in the form of graphite, etc., wherein the carbon may range upwardly to about 2.25%. This figure will vary in accordance with the final carbon content required in the article and will also vary in accordance with the residual quantities of iron oxide in the powder for it has been found that a starting percentage of 2.25% carbon used with commercial reduced iron oxide powder will produce an article having about .85% carbon after sintering. This is explained by the reduction of residual oxide during the sintering step. For this reason, the percentage addition of carbon should be carefully checked with particular reference to the type of powder being used so that a final carbon percentage ranging from .40% to 1.0% is obtained which is the preferred range of carbon in the finished article. The iron powder itself may be of any suitable size although 100 or 150 mesh powder yields very satisfactory results and the figures herein are based on the use of 100 mesh powder. This iron carbon mixture is next briquetted to a size slightly larger than that ultimately desired at briquetting pressures ranging anywhere from 30,000 to 60,000 pounds per square inch. This briquetting operation produces a green compact which is self-sustaining in character. This compact is then sintered under controlled atmospheric conditions, for example, in a nonoxidizing or reducing atmosphere at a temperature ranging from 1600° to 1700° F. and for a time period ranging from twenty to forty-five minutes. During this sintering procedure, adjacent particles of iron bond together to form a porous network while the carbon which is present does not tend to diffuse appreciably into the iron due to the low temperatures of sintering. This is extremely important since it is obvious that if a subsequent sizing step is to be utilized, the part must be compressible. When carbon diffusion occurs in appreciable quantities, the compressibility of the part reduces in direct proportion thereto whereby when the complete diffusion has occurred, the part does not have sufficient compressibility to permit any appreciable sizing. Therefore it is stressed that the first sintering step be carried out under time and temperature conditions so as to prevent appreciable carbon diffusion.

The part is then taken from the furnace and sized in a die to the exact shape and size desired. In this instance, the part may be cooled down to room temperature or may be transferred hot. It is apparent that the pressures involved will vary but either type of sizing is satisfactory. For purposes of example, if the part is cooled and transferred to a die it may be sized under pressures ranging from 60,000 to 150,000 pounds per square inch. This will bring the part to the exact shape and size desired and due to the compressibility of the porous iron network, the part actually compresses within itself to produce a reduced porosity and an increased density while producing no flash. This sized part is then given the final sintering which is then carried out under controlled atmospheric conditions, with temperatures ranging from 1900° to 2050° F., for a time ranging from twenty to forty-five minutes. During this final sintering, carbon diffusion occurs and the tensile strength of the part is thereby increased tremendously while the ductility thereof is reduced to some extent. The part is then cooled under controlled conditions of atmosphere.

The compression figures noted will vary considerably for the type of powder used and the density desired. In general, however, compression figures within the ranges noted would yield the desired results. In this instance, however, it is pointed out that the first briquetting operation should be carried out to yield a density in the part of from 90 to 100 grams per cubic inch. The sizing operation on the other hand should be controlled to increase this density to from 105 to 122 grams per cubic inch as compared with a theoretical density of 129 grams per cubic inch for wrought material having the same composition.

When high strength infiltrated parts are desired, we utilize relatively lower sizing pressures so that the material, after final sintering, may be infiltrated with a cupreous metal for example. In this respect it is pointed out that at densities greater than 113 grams per cubic inch, infiltration of the article is difficult, if not impossible, and for this reason when infiltration is to be practiced, the final sizing pressure should be controlled so that densities not in excess of 113 grams per cubic inch are maintained.

After this controlled sizing step, the part is finally sintered and is then ready for copper infiltration which may be carried out by any one of a number of suitable methods. For example, in Bourne, Patent No. 2,401,221, one method of infiltration is discussed while in copending application, Serial No. 156,619, another method of infiltration is discussed. In the present instance, the teachings of this application may be easily carried out by briquetting a foot portion on the blade to act as a gate. Also in copending application, Serial No. 289,271, filed concurrently herewith, still another method of infiltration is suggested which may be carried out simultaneously with the final sintering of the article. In each and every case with respect to the infiltrating methods suggested, iron sufficient to satisfy the dissolving action of the cupreous metal may be added thereto so as to prevent and/or reduce the dissolving action of the cupreous metal as it infiltrates the blade. In any event, the blade may be infiltrated with copper or other cupreous metal, such as cupreous alloy, by the methods discussed so as to provide a completely impregnated or infiltrated blade. This blade may then be electroplated to provide a suitable finish thereon.

Besides adding strength to the part, the cupreous infiltration of the blade eliminates the porosity of the metal and presents a continuous surface for the electroplate which obviates any corrosion problems due to electrolyte being present in the pores of the article.

While this disclosure mentions blades for axial flow compressors, etc., any part wherein an infiltrated material is useful and which requires high tensile strength, may be made by the same process.

This disclosure, being directed to iron carbon mixtures, is of sufficient scope to comprehend the addition of alloying ingredients to the mix, wherein the alloying ingredient or ingredients are added in small quantities for example, up to 10%. Such ingredients as nickel, chromium, manganese, etc., and in fact, any of the usual alloying ingredients used with iron may be added either as separate metal powders, or the iron powder may be of a prealloyed type wherein the alloying ingredient or ingredients are associated with each particle. In all cases, iron should make up at least 85% by weight of the final article.

The method as set forth herein is considerably easier to control than hot-pressing or hot-coining methods normally used to produce high strength parts. This is explained by the fact that the dimensional change in the part under the present conditions is relatively small in that the part is briquetted to the approximate size, sintered below the carbon diffusion temperature, sized down within itself while in a highly compressible condition to the exact size, and is then sintered at temperatures above the carbon diffusion temperature to increase the strength thereof. In the hot-forging operation, the complete sintering procedure is carried out in one step whereby full carbon diffusion is obtained so that the forging step requires extreme pressures with relatively large dimensional changes. Furthermore, flash is eliminated by the present process.

It is manifest that the part as it comes from the final sintering step, may be suitably heat treated as is well known in the art. Heat treated parts made under the methods set forth herein will yield tensile strength figures of from 120,000 to 160,000 pounds per square inch with elongations up to 2.5%. These figures will vary according to the material involved, sizing pressures and heat treatments used.

While the embodiments of the present invention as herein disclosed, constitute preferred forms, it is to be understood that other forms might be adopted.

What is claimed is as follows:

1. The steps in the method of making articles of high strength and low porosity from mixtures of iron powder and carbon comprising, briquetting a mixture of iron powder and carbon to a density ranging from 90 to 100 grams per cubic inch, heating the briquetted part in a shape approximating that desired and of a size slightly larger than ultimately desired, under non-oxidizing condition at a temperature and for a time to cause the iron powder to adhere together and simultaneously for preventing appreciable carbon diffusion, briquetting the part so formed under pressure sufficient to size the part to the size desired and simultaneously bring the density to from 105 to 122 grams per cubic inch, and then sintering the compressed part under controlled conditions of atmosphere to a higher temperature and for a time sufficient to cause carbon diffusion for forming a strong homogeneous article of high density.

2. In a method for forming articles of high strength from mixtures comprising, essentially, iron powder and carbon in the uncombined form, the steps comprising; briquetting the mixture of iron powder and carbon under pressures sufficient to bring the density of the briquet to from 90 to 100 grams per cubic inch and to form a briquet of a shape desired but of slightly larger dimensions than ultimately desired, agglomerating the iron powder in said briquet by heating the same under controlled conditions at a temperature below the diffusion temperature for carbon, sizing the agglomerated briquet to a size and shape exactly as desired at pressures sufficient to increase the density up to 122 grams per cubic inch and finally sintering the sized briquet under controlled atmospheric conditions and at a higher temperature and for a time sufficient to cause carbon diffusion for forming a strong sintered article having a density not in excess of 105 grams per cubic inch.

3. The method of forming strong homogeneous articles from iron powder mixed with carbon, the steps comprising; shaping a mixture of iron powder and carbon into a self-sustaining mass having a density not in excess of 100 grams per cubic inch to a shape approximating that ultimately desired and of a size slightly larger than that ultimately desired, heating the self-sustaining shape under non-oxidizing conditions at a temperature below the carbon diffusion temperature and for a time sufficient to agglomerate the powder into a porous network, compressing the agglomerated article under high pressures for bringing the density thereof to at least 105 grams per cubic inch and then reheating the compressed article to a higher temperature and above the carbon diffusion temperature and for a time sufficient to cause carbon diffusion and final sintering of the article wherein said operation is carried out under controlled conditions of atmosphere.

4. The steps in the method for making high strength, low porosity parts from mixtures of iron and carbon powders wherein iron makes up at least 85% by weight of the article, the steps comprising; mixing iron powder with carbon so as to form a mixture which will ultimately yield diffused carbon in quantities of less than 1%, briquetting said mixture into a self-sustaining mass at briquetting pressures sufficient to yield a density not in excess of 100 grams per cubic inch and of a size slightly larger than that desired and to a shape substantially similar to that ultimately desired, agglomerating the briquetted powder under controlled conditions of atmosphere and for a time and at a temperature not in excess of 1700° F., for forming a porous iron network devoid of carbon diffusion, sizing said agglomerated article at pressures sufficient to bring the density to a figure not in excess of 123 grams per cubic inch and finally resintering the sized article at a temperature in the order of from 1900° to 2050° F. under controlled atmospheric conditions and for a time sufficient to form a strong article including diffused carbon therein.

5. The method as claimed in claim 3 wherein the density of the article after the compressing step is at least 105 grams per cubic inch and not more than 113 grams per cubic inch and wherein the sintered article is subsequently impregnated with a cupreous metal.

6. The steps in the method for making high strength, low porosity parts from mixtures of iron and carbon powders wherein iron makes up at least 85% by weight of the article, the steps comprising; mixing iron powder with carbon so as to form a mixture which will ultimately yield diffused carbon in quantities of less than 1%, briquetting said mixture into a self-sustaining mass at briquetting pressures sufficient to yield a density not in excess of 100 grams per cubic inch and of a size slightly larger than that desired and to a shape substantially similar to that ultimately desired, agglomerating the briquetted powder under controlled conditions of atmosphere and for a time and at a temperature not in excess of 1700° F., for forming a porous iron network devoid of carbon diffusion, sizing said agglomerated article at pressures sufficient to bring the density to a figure not in excess of 113 grams per cubic inch, resintering the sized article at a temperature in the order of from 1900° to 2050° F. under controlled atmospheric conditions and for a time sufficient to form a strong article including diffused carbon therein, and then infiltrating the sintered part with a cupreous metal.

References Cited in the file of this patent

UNITED STATES PATENTS

| | | |
|---|---|---|
| 1,728,909 | Schroter | Sept. 17, 1929 |
| 2,298,885 | Hull | Oct. 13, 1942 |
| 2,315,302 | Volterra | Mar. 30, 1943 |
| 2,342,799 | Goetzel | Feb. 29, 1944 |
| 2,411,073 | Whitney | Nov. 12, 1946 |